United States Patent
Tozu et al.

(10) Patent No.: US 6,324,445 B2
(45) Date of Patent: *Nov. 27, 2001

(54) YAW RATE DETECTING SYSTEM FOR A VEHICLE

(75) Inventors: Kenji Tozu, Yokkaichi; Akitaka Nishio, Okazaki, both of (JP)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,524

(22) Filed: Oct. 12, 1999

(30) Foreign Application Priority Data

Oct. 13, 1998 (JP) .................................................. 10-307825

(51) Int. Cl.⁷ ........................................................ B62D 6/00
(52) U.S. Cl. .................................. 701/1; 701/41; 701/71; 303/146
(58) Field of Search .................................. 701/1, 41, 42, 701/82, 71, 70; 303/146

(56) References Cited

U.S. PATENT DOCUMENTS

| | | | |
|---|---|---|---|
| 5,369,580 | 11/1994 | Monji et al. | 701/1 |
| 5,524,079 | * 6/1996 | Ishida et al. | 701/36 |
| 5,719,790 | 2/1998 | Lohrenz et al. | 702/104 |
| 5,915,800 | * 6/1999 | Hiwatashi et al. | 303/146 |
| 6,070,952 | * 6/2000 | Tozu et al. | 303/146 |

FOREIGN PATENT DOCUMENTS

| | | |
|---|---|---|
| 42 08 404 | 9/1992 | (DE). |
| 690 14 108 | 6/1995 | (DE). |
| 195 02 858 | 7/1996 | (DE). |
| 691 26 929 | 11/1997 | (DE). |
| 0 469 057 | 11/1994 | (EP). |
| 0 471 299 | 7/1997 | (EP). |
| 5-314397 | 11/1993 | (JP). |
| 6-87460 | 3/1994 | (JP). |

\* cited by examiner

*Primary Examiner*—Tan Nguyen
(74) *Attorney, Agent, or Firm*—Burns, Doane, Swecker & Mathis, LLP

(57) ABSTRACT

The present invention is directed to a yaw rate detecting system for a vehicle, which includes a yaw rate sensor for measuring a yaw rate of the vehicle. The apparatus is adapted to determine a stopped state of the vehicle, set a zero point at the yaw rate measured by the yaw rate sensor when the stopped state of the vehicle is determined, and calculate an actual yaw rate in response to an output of the yaw rate sensor, on the basis of the zero point. The actual yaw rate is calculated by subtracting the yaw rate at the zero point from the yaw rate measured by the yaw rate sensor. It may be so arranged that a desired yaw rate is set on the basis of a vehicle speed and a steering angle, and the zero point is corrected in response to a comparison of the desired yaw rate and the actual yaw rate. For example, a temporary zero point is set when the stopped state of the vehicle is determined, and a deviation between the desired yaw rate and the actual yaw rate is calculated. In this case, the actual yaw rate is calculated by subtracting the yaw rate at the temporary zero point from the yaw rate measured by the yaw rate sensor. Then, the zero point is corrected on the basis of the temporary zero point in response to the deviation.

8 Claims, 9 Drawing Sheets

YAW RATE DETECTING SYSTEM FOR A VEHICLE

This application claims priority under 35 U.S.C. Sec. 119 to No.10-307825 filed in Japan on Oct. 13, 1998, the entire content of which is herein incorporated by reference.

BACKGROUND OF THE INVENTION

1. Field of the Invention

The present invention relates to a yaw rate detecting system for a vehicle, and more particularly to an apparatus and method for detecting the yaw rate of the vehicle for use in a vehicle motion control system.

2. Description of the Related Arts

Recently, a system for controlling a vehicle motion characteristic, particularly a turning characteristic of a vehicle, has been noted, and a vehicle motion control system which is adapted to directly control a rotating moment by controlling a difference of braking force applied to left and right wheels, is now on the market. For example, when it is determined that the excessive oversteer occurs during cornering, the braking force will be applied to a front wheel located on the outside of the curve in the vehicle's path for example, to produce a moment for forcing the vehicle to turn in the direction toward the outside of the curve, i.e., an outwardly oriented moment, in accordance with an oversteer restraining control which may be called as a vehicle stability control. When it is determined that the excessive understeer occurs while a vehicle is undergoing a cornering maneuver, for example, the braking force will be applied to force the vehicle to turn in the direction toward the inside of the curve, i.e., an inwardly oriented moment, in accordance with an understeer restraining control, which may be called as a course trace performance control. The above described oversteer restraining control and understeer restraining control as a whole may be called as a steering control by braking. Accordingly, irrespective of brake pedal operation, the braking force applied to each wheel is controlled in response to a comparison of a desired yaw rate and an actual yaw rate, for example.

In the vehicle motion control system as described above, a sensor for detecting a vehicle yaw rate is employed, as described in Japanese Patent Laid-open Publication No.5-314397, for example. It is stated in that Publication that a prior apparatus for processing a signal output from a sensor neglects compensation for drift component included in the signal output from the sensor, so that an apparatus for processing the sensor signal has been proposed so as to calculate an accurate yaw rate irrespective of the drifted amount of the yaw rate sensor. In practice, a zero point signal of the yaw rate sensor is renewed to provide such a relationship that each value of steering angle of positive or negative value within a certain time period and each value of yaw rate of positive or negative value within a certain time period will coincide with each other, under a certain running condition. Also proposed is such a method that an output of the yaw rate sensor is renewed to be zero, in the case where an estimated generating yaw rate estimated in response to the output of the yaw rate sensor, e.g., steering angle, speed in the longitudinal direction, and vehicle characteristic, is smaller than a predetermined allowable yaw rate error, under such a running condition that the yaw rate is not generated, as in the case where the vehicle is running on a straight road at a low speed.

According to the apparatus for processing the sensor signal, however, an output of a steering angle sensor with low resolution is directly used for renewing the zero point. Therefore, it is impossible to set or renew the zero point signal accurately for the yaw rate sensor. Particularly, in calculating a vehicle side slip angle for use in the steering control by braking, errors in the output of the steering angle are accumulated to cause a large error. Furthermore, the process for correcting the error of the zero point by means of the apparatus for processing the output of the sensor as disclosed in the Publication is complicated, so that a relatively long processing time is needed.

SUMMARY OF THE INVENTION

Accordingly, it is an object of the present invention to set a zero point of a yaw rate sensor accurately, to detect a yaw rate of a vehicle on the basis of the zero point.

In accomplishing the above and other objects, an apparatus for detecting the yaw rate of the vehicle is adapted to include a yaw rate sensor for measuring a yaw rate of the vehicle, a stoppage determining device for determining a stopped state of the vehicle, a zero point setting device for setting a zero point at the yaw rate measured by the yaw rate sensor when the stoppage determining device determines the stopped state of the vehicle, and an actual yaw rate calculating device for calculating an actual yaw rate in response to an output of the yaw rate sensor, on the basis of the zero point set by the zero point setting device. According to the actual yaw rate calculating device, the actual yaw rate can be calculated by subtracting the yaw rate at the zero point from the yaw rate measured by the yaw rate sensor.

Preferably, the apparatus may further include a vehicle speed detecting device for detecting a vehicle speed of the vehicle, a steering angle detecting device for detecting a steering angle of the vehicle, a desired yaw rate setting device for setting a desired yaw rate on the basis of the vehicle speed detected by the vehicle speed detecting device and the steering angle detected by the steering angle detecting device, and a zero point correcting device for correcting the zero point set by the zero point setting device in response to a comparison of the desired yaw rate set by the desired yaw rate setting device and the actual yaw rate calculated by the actual yaw rate calculating device. The stoppage determining device may be constituted by the vehicle speed detecting device and a parking switch activated in response to a state of a parking brake of the vehicle, and adapted to determine the stopped state of the vehicle, when it is determined that the parking brake is activated on the basis of an output of the parking switch, and that the vehicle speed is lower than a predetermined speed on the basis of the output of the vehicle speed detecting device.

It may be so arranged that the zero point setting device includes a temporary zero point setting device for setting a temporary zero point in response to the result determined by the stoppage determining device, and the zero point correcting device includes a deviation calculating device for calculating a deviation between the desired yaw rate set by the desired yaw rate setting device and the actual yaw rate calculated by the actual yaw rate calculating device in response to the output of the yaw rate sensor, on the basis of the temporary zero point set by the temporary zero point setting device, and the zero point correcting device is adapted to correct the zero point on the basis of the temporary zero point, in response to the deviation calculated by the deviation calculating device and the vehicle speed detected by the vehicle speed detecting device. The actual yaw rate calculating device may be adapted to calculate the actual yaw rate by subtracting the yaw rate at the temporary zero point from the yaw rate measured by the yaw rate sensor.

The zero point correcting device may be adapted to renew the zero point by the temporary zero point, when the deviation calculated by the deviation calculating device is lower than a predetermined value, and such a state that the vehicle speed detected by the vehicle speed detecting device exceeds a predetermined speed has continued for a period longer than a predetermined time period. Furthermore, the zero point correcting device may be prohibited from correcting the zero point, when such a state that the deviation calculated by the deviation calculating device exceeds a predetermined value has continued for a period longer than a predetermined time period.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
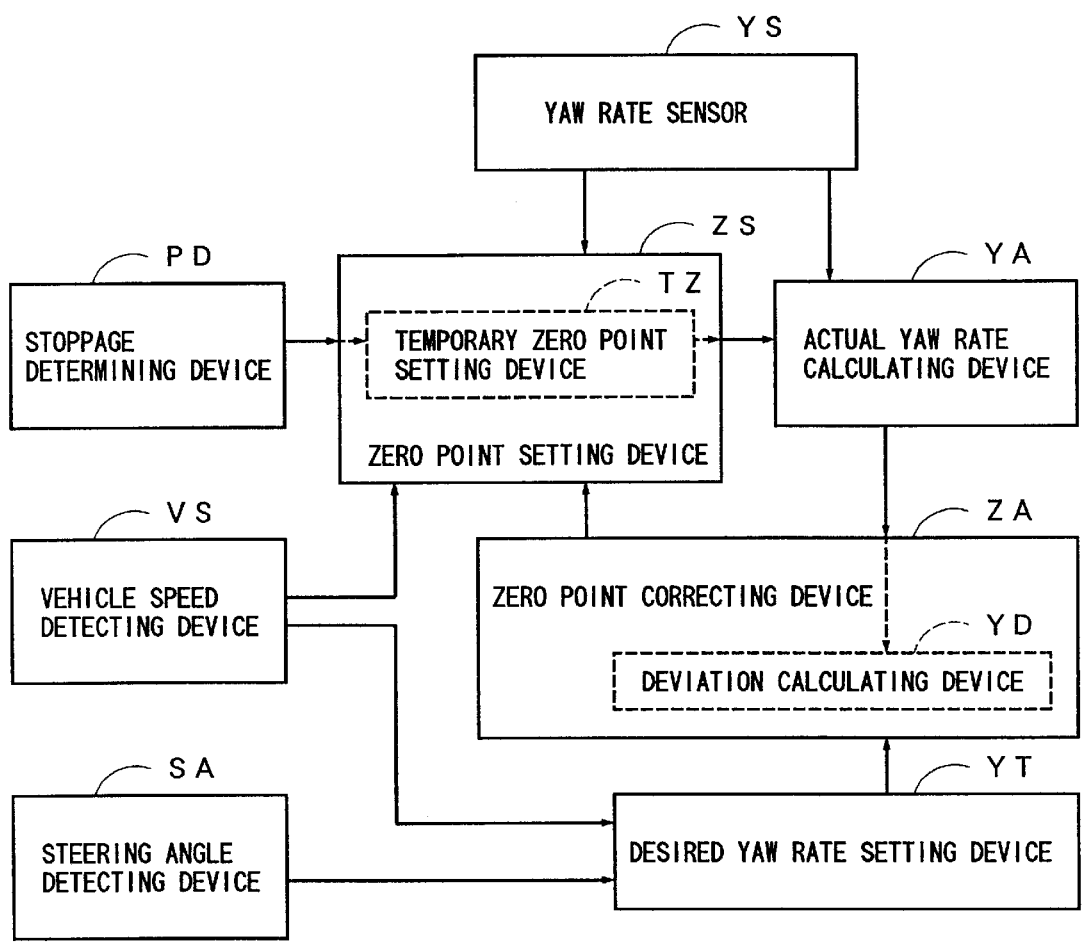
FIG. 1 is a block diagram illustrating an embodiment of an apparatus for detecting a yaw rate of a vehicle according to an embodiment of the present invention.

Referring to FIG. 1, there is schematically illustrated an apparatus for detecting a yaw rate of a vehicle according to an embodiment of the present invention. The apparatus includes a yaw rate sensor YS for measuring a yaw rate of the vehicle, a stoppage determining device PD for determining a stopped state of the vehicle, a zero point setting device ZS for setting a zero point at the yaw rate measured by the yaw rate sensor YS when the stoppage determining device PD determines the stopped state of the vehicle, and an actual yaw rate calculating device YA which is adapted to calculate an actual yaw rate in response to an output of the yaw rate sensor YS, on the basis of the zero point set by the zero point setting device ZS. According to the apparatus as constituted in the above, the zero point can be set accurately, because the output of the steering angle sensor as used in the prior art is not directly used for setting the zero point.

As shown in FIG. 1, such components may be further provided as a vehicle speed detecting device VS for detecting a vehicle speed of the vehicle, a steering angle detecting device SA for detecting a steering angle of the vehicle, a desired yaw rate setting device YT for setting a desired yaw rate on the basis of the vehicle speed detected by the vehicle speed detecting device VS and the steering angle detected by the steering angle detecting device SA. And, a zero point correcting device ZA may be provided for correcting the zero point set by the zero point setting device ZS in response to a comparison of the desired yaw rate set by the desired yaw rate setting device YT and the actual yaw rate calculated by the actual yaw rate calculating device YA.

According to the actual yaw rate calculating device YA, the actual yaw rate can be calculated by subtracting the yaw rate at the zero point from the yaw rate measured by the yaw rate sensor YS.

In the case where the vehicle is on a ferryboat, or the vehicle is on a rotating turntable, the yaw rate sensor YS is swung or rotated, while it is in a stopped state relative to the vehicle, thereby to cause an error in the output of the sensor YS. In order to avoid this error, therefore, the present embodiment is so arranged that the zero point setting device ZS includes a temporary zero point setting device TZ for setting a temporary zero point in response to the result determined by the stoppage determining device PD, and that the zero point correcting device ZA includes a deviation calculating device YD for calculating a deviation between the desired yaw rate set by the desired yaw rate setting device YT and the actual yaw rate calculated by the actual yaw rate calculating device YA in response to the output of the yaw rate sensor YS, on the basis of the temporary zero point set by the temporary zero point setting device TZ. And, the zero point correcting device ZA is adapted to correct the zero point on the basis of the temporary zero point, in response to the deviation calculated by the deviation calculating device YD and the vehicle speed detected by the vehicle speed detecting device VS.

In practice, the actual yaw rate calculating device YA is adapted to calculate the actual yaw rate by subtracting the yaw rate at the temporary zero point from the yaw rate measured by the yaw rate sensor YS. And, the zero point correcting device ZA is adapted to renew the zero point by the temporary zero point, when the deviation calculated by the deviation calculating device YD is lower than a predetermined value, and such a state that the vehicle speed detected by the vehicle speed detecting device VS exceeds a predetermined speed has continued for a period longer than a predetermined time period. Therefore, the zero point to the yaw rate sensor can be corrected certainly, even in the case where the vehicle is placed on the ferryboat, the rotating table, and the like. When such a state that the deviation calculated by the deviation calculating device YD exceeds a predetermined value has continued for a period longer than a predetermined time period, it is determined to be abnormal, so that the zero point correcting device ZA is prohibited from correcting the zero point.

Figure 2:
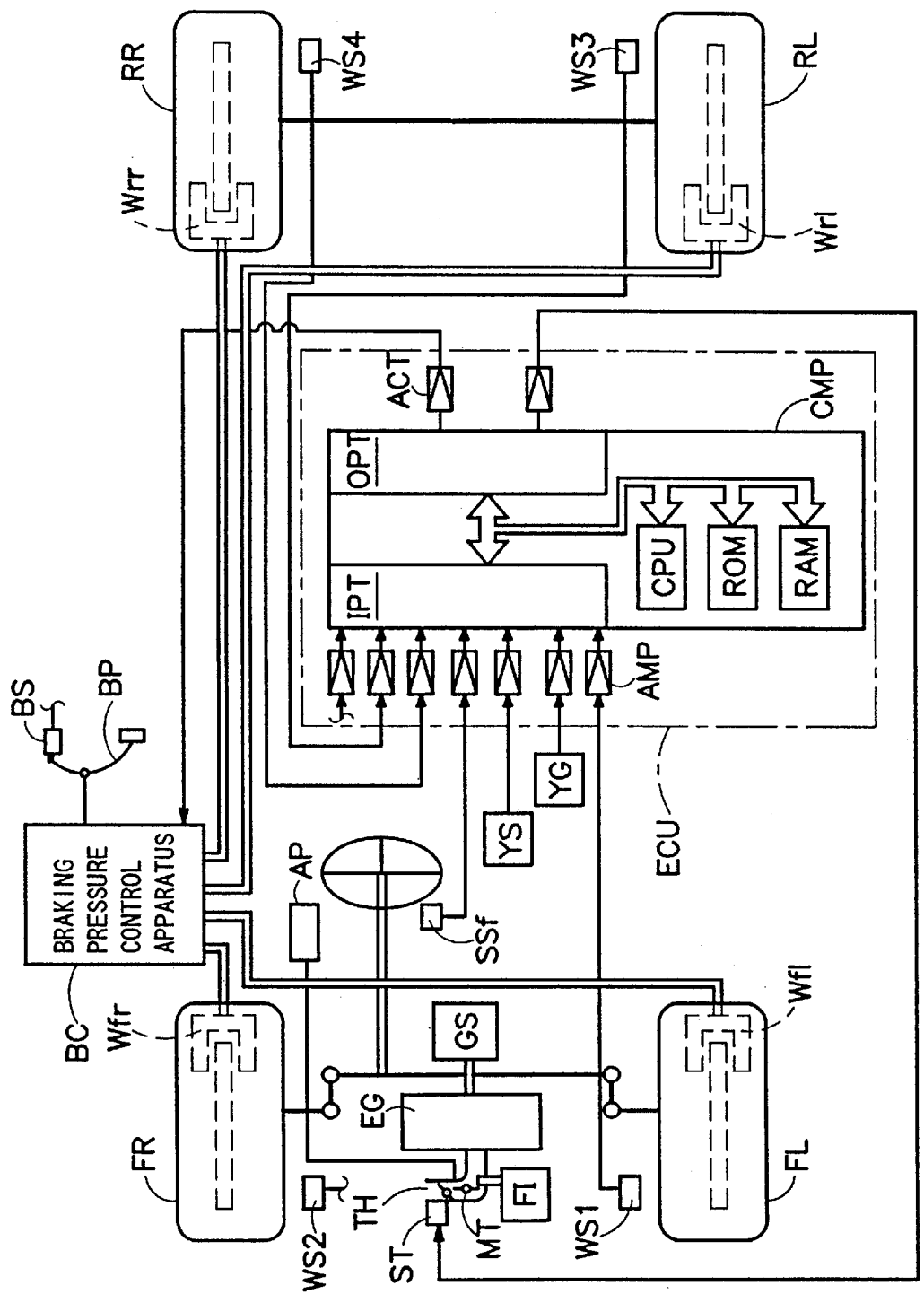
FIG. 2 is a schematic block diagram of a vehicle having a brake control system including the yaw rate detecting apparatus according to an embodiment of the present invention.

Referring to FIG. 2, there is schematically illustrated a vehicle including the yaw rate detecting apparatus according to an embodiment of the present invention. The vehicle has an engine EG provided with a fuel injection apparatus FI and a throttle control apparatus TH which is arranged to control a main throttle opening of a main throttle valve MT in response to operation of an accelerator pedal AP. The throttle control apparatus TH has a sub-throttle valve ST which is actuated in response to an output signal of an electronic controller ECU to control a sub-throttle opening. Also, the fuel injection apparatus FI is actuated in response to an output signal of the electronic controller ECU to control the fuel injected into the engine EG. According to the present embodiment, the engine EG is operatively connected with the front wheels FL, FR through a transmission GS to provide a front-drive system, but the present embodiment is not limited to the front-drive system. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

With respect to a braking system according to the present embodiment, wheel brake cylinders Wfl, Wfr, Wrl, Wrr are operatively mounted on the wheels FL, FR, RL, RR of the vehicle, respectively, and which is fluidly connected to a hydraulic braking pressure control apparatus BC. The pressure control apparatus BC in the present embodiment may be arranged as illustrated in FIG. 1 which will be explained later in detail. According to the present embodiment, a so-called diagonal circuit system has been employed.

As shown in FIG. 2, at the wheels FL, FR, RL and RR, there are provided wheel speed sensors WS1 to WS4 respectively, which are connected to the electronic controller ECU, and by which a signal having pulses proportional to a rotational speed of each wheel, i.e., a wheel speed signal is fed to the electronic controller ECU. Also provided are a parking switch PB, which turns on when a parking brake (not shown) is operated to hold the vehicle in the stopped state, a brake switch BS which turns on when the brake pedal BP is depressed, a front steering angle sensor SSf for detecting a steering angle δf of the front wheels FL, FR, a lateral acceleration sensor YG for detecting a vehicle lateral acceleration, and a yaw rate sensor YS for detecting a yaw rate of the vehicle. These are electrically connected to the electronic controller ECU. According to the yaw rate sensor YS for use in the apparatus of the present invention, a varying rate of rotational angle of the vehicle about a normal on the center of gravity of the vehicle, i.e., a yaw angular velocity or a measured yaw rate γas is fed to the electronic controller ECU.

As shown in FIG. 2, the electronic controller ECU is provided with a microcomputer CMP which includes a central processing unit or CPU, a read-only memory or ROM, a random access memory or RAM, an input port IPT, and an output port OPT, and etc. The signals detected by each of the wheel speed sensors WS1 to WS4, brake switch BS, front steering angle sensor SSf, yaw rate sensor YS and lateral acceleration sensor YG are fed to the input port IPT via respective amplification circuits AMP and then to the central processing unit CPU. Then, control signals are fed from the output port OPT to the throttle control apparatus TH and hydraulic braking pressure control apparatus BC via the respective driving circuits ACT. In the microcomputer CMP, the read-only memory ROM memorizes a program corresponding to flowcharts as shown in FIGS. 3A, 3B to FIG. 6, the central processing unit CPU executes the program while the ignition switch (not shown) is closed, and the random access memory RAM temporarily memorizes variable data needed to execute the program. A plurality of microcomputers may be provided for each control such as throttle control, or may be provided for performing various controls, and electrically connected to each other.

Figure 3A:
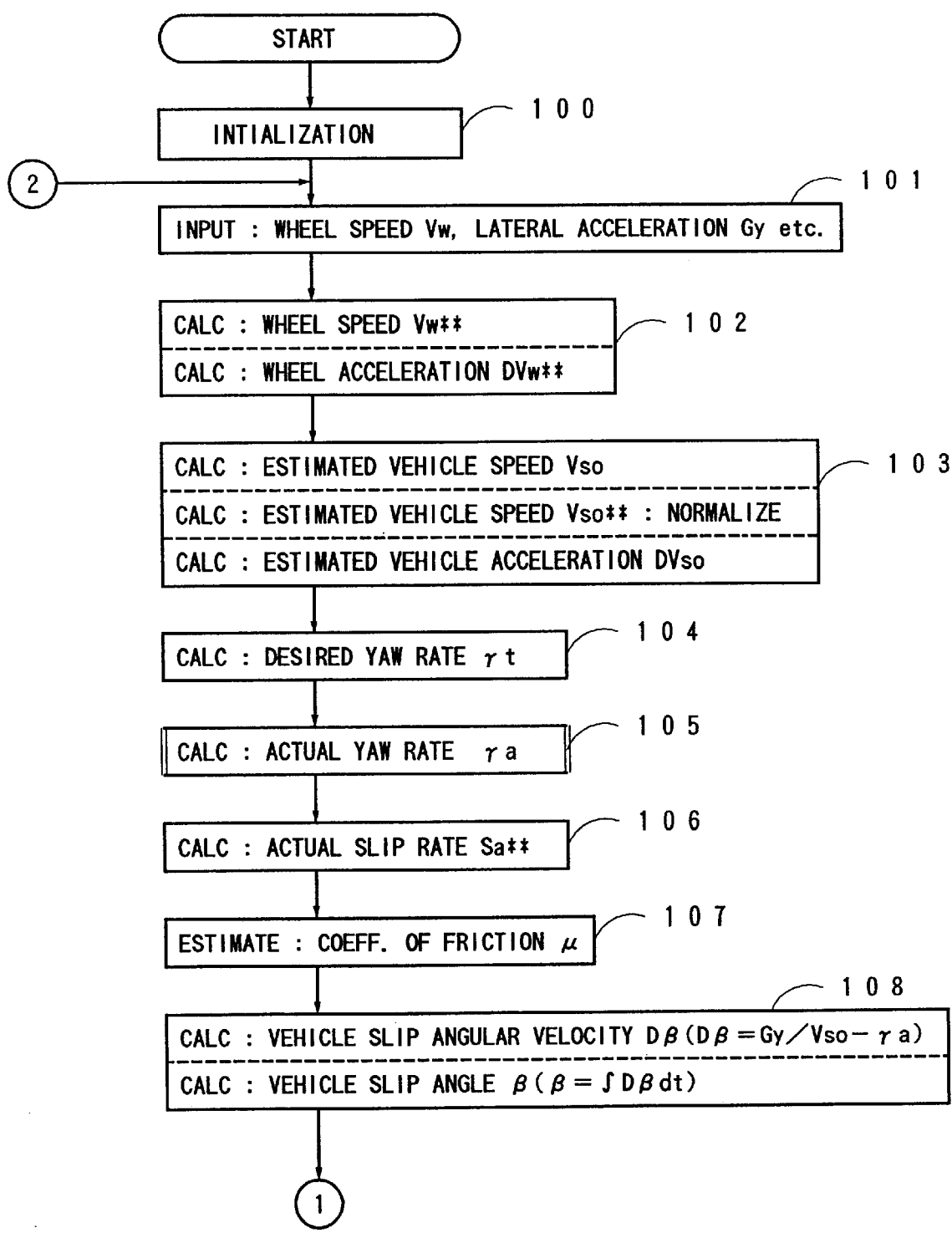
FIGS. 3A and 3B are flowcharts showing a main routine of the brake control.
Figure 3B:
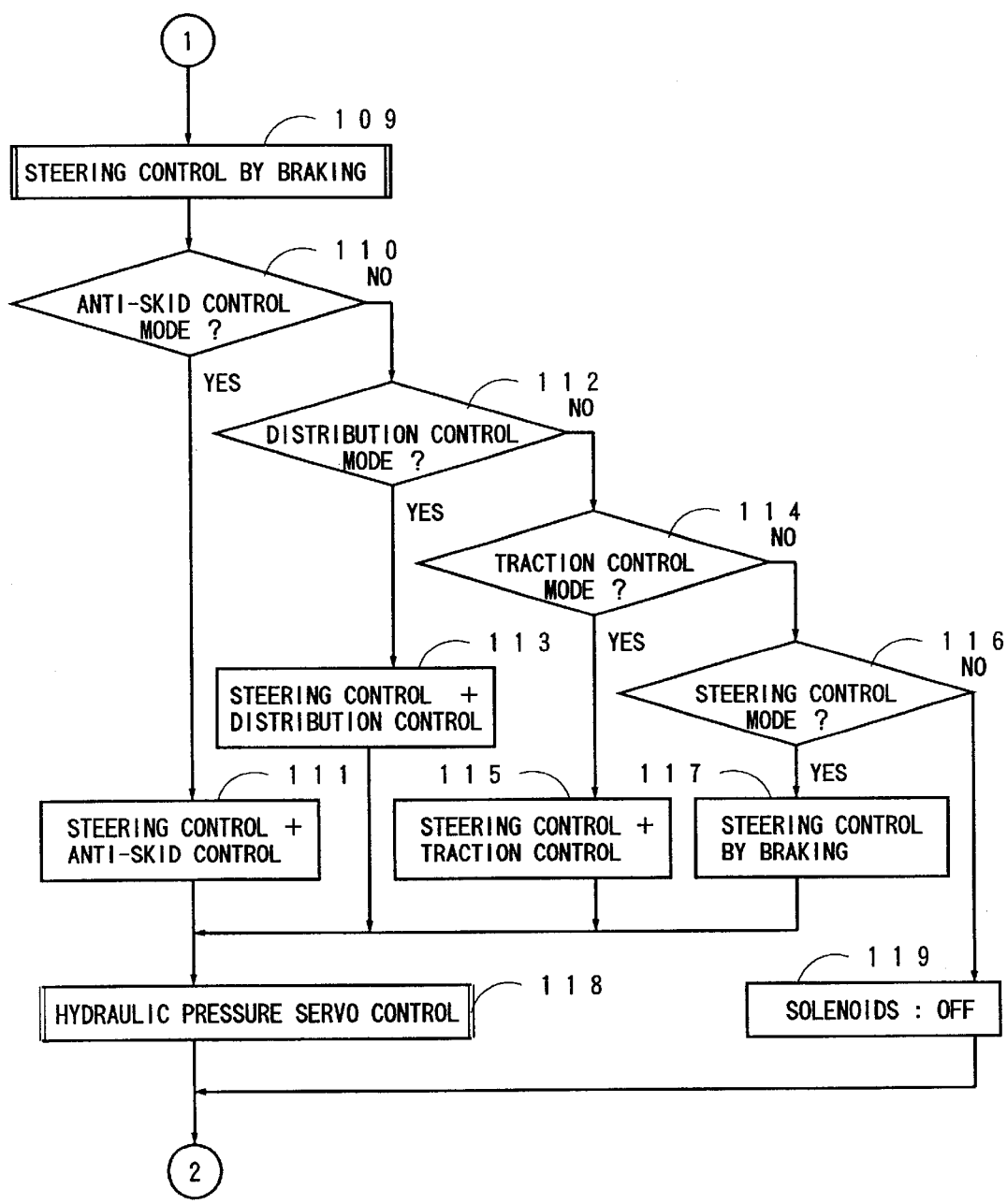

According to the present embodiment as constituted above, a program routine for the vehicle motion control including the steering control by braking, anti-skid control and so on is executed by the electronic controller ECU, as will be described hereinafter with reference to FIGS. 3A, 3B to FIG. 6. The program routine starts when an ignition switch (not shown) is turned on. At the outset, the program for the brake control as shown in FIGS. 3A, 3B provides for initialization of the system at Step 100 to clear various data. At Step 101, the signals detected by the wheel speed sensors WS1 to WS4 are read by the electronic controller ECU, and also read are the signal (steering angle δf) measured by the front steering angle sensor SSf, the signal (actual yaw rate γas) measured by the yaw rate sensor YS, and the signal (lateral acceleration Gya) measured by the lateral acceleration sensor YG.

Then, the program proceeds to Step 102 where the wheel speed Vw ( represents one of the wheels FL, FR, RL, RR) of each wheel is calculated, and differentiated to provide the wheel acceleration DVw. At Step 103, the maximum of the wheel speeds Vw for four wheels is calculated to provide an estimated vehicle speed Vso on a gravity center of the vehicle (Vso=MAX[Vw]), and an estimated vehicle speed Vso is calculated for each wheel, respectively, on the basis of the wheel speed Vw. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration DVso. Next, the program proceeds to Step 104, where the desired yaw rate γt is calculated in accordance with the following equation:

$$\gamma t = \{\delta f/(N \cdot L)\} \cdot Vso/(1 + Kh \cdot Vso^2)$$

where "Kh" is a stability factor, "NH" is a steering gear ratio, and "L" is a wheelbase of the vehicle. Then, at Step 105, an actual yaw rate γa is calculated, as will be described later.

At Step 106, also calculated is an actual slip rate Sa on the basis of the wheel speed Vw for each wheel and the estimated vehicle speed Vso** (or, the estimated and normalized vehicle speed) which are calculated at Steps 102 and 103, respectively, in accordance with the following equation:

$$Sa^{} = (Vso^{} - Vw^{})/Vso^{}$$

Then, at Step 107, on the basis of the vehicle acceleration DVso and the actual lateral acceleration Gya measured by the lateral acceleration sensor YG, the coefficient of friction μ against a road surface can be calculated in accordance with the following equation:

$$\mu \approx (DVso^2 + Gya^2)^{1/2}$$

In order to detect the coefficient of friction against the road surface, various methods may be employed other than the above method, such as a sensor for directly detecting the coefficient of friction against the road surface.

The program proceeds to Step 108, where a vehicle slip angular velocity Dβ is calculated, and then a vehicle slip angle β is calculated. This vehicle slip angle β is an angle which corresponds to a vehicle slip against the vehicle's path of travel, and which can be estimated as follows. That is, at the outset, the vehicle slip angular velocity Dβ, which is a differentiated value dβ/dt of the vehicle slip angle β, is calculated at Step 108 in accordance with the following equation:

$$D\beta = Gy/Vso - \gamma a$$

Then, the vehicle slip angle β is calculated in accordance with the following equation:

$$\beta = \int (Gy/Vso - \gamma a) dt$$

where "Gy" is the lateral acceleration of the vehicle, "Vso" is the estimated vehicle speed of the vehicle measured at its gravity center, and "γra" is the actual yaw rate. According to the present embodiment, the actual yaw rate γa is provided for calculating the vehicle slip angle β and vehicle slip angular velocity Dβ.

Then, the program proceeds to Step 109 where the mode for the steering control by braking is made to provide a desired slip rate for use in the steering control by braking, wherein the braking force applied to each wheel is controlled at Step 118 through the hydraulic pressure servo control which will be explained later. The steering control by braking is to be added to each control performed in all the control modes described later. Then, the program proceeds to Step 110, where it is determined whether the condition for initiating the anti-skid control is fulfilled or not. If it is determined that the condition is in the anti-skid control mode, the program proceeds to Step 111, where a control mode performing both the steering control by braking and the anti-skid control start.

If it is determined at Step 110 that the condition for initiating the anti-skid control has not been fulfilled, then the program proceeds to Step 112 where it is determined whether the condition for initiating the front and rear braking force distribution control is fulfilled or not. If it is affirmative at Step 112, the program further proceeds to Step 113 where a control mode for performing both the steering control by braking and the braking force distribution control is performed, otherwise it proceeds to Step 114, where it is determined whether the condition for initiating the traction control is fulfilled or not. If the condition for initiating the traction control is fulfilled, the program proceeds to Step 115 where a control mode for performing both the steering control by braking and the traction control is performed. Otherwise, the program proceeds to Step 116 where it is determined whether the condition for initiating the steering control by braking is fulfilled or not. If the condition for initiating the steering control by braking is fulfilled, the program proceeds to Step 117 where a control mode for performing only the steering control by braking is set. On the basis of the control modes as set in the above, the hydraulic pressure servo control is performed at Step 118, and then the program returns to Step 101. If it is determined at Step 116 that the condition for initiating the steering control by braking has not been fulfilled, the program proceeds to Step 119 where solenoids for all of the solenoid valves are turned off, and then the program returns to Step 101. In accordance with the control modes set at Steps 111, 113, 115 and 117, the sub-throttle opening angle for the throttle control apparatus TH may be adjusted in response to the condition of the vehicle in motion, so that the output of the engine EG could be reduced to limit the driving force produced thereby.

Figure 4:
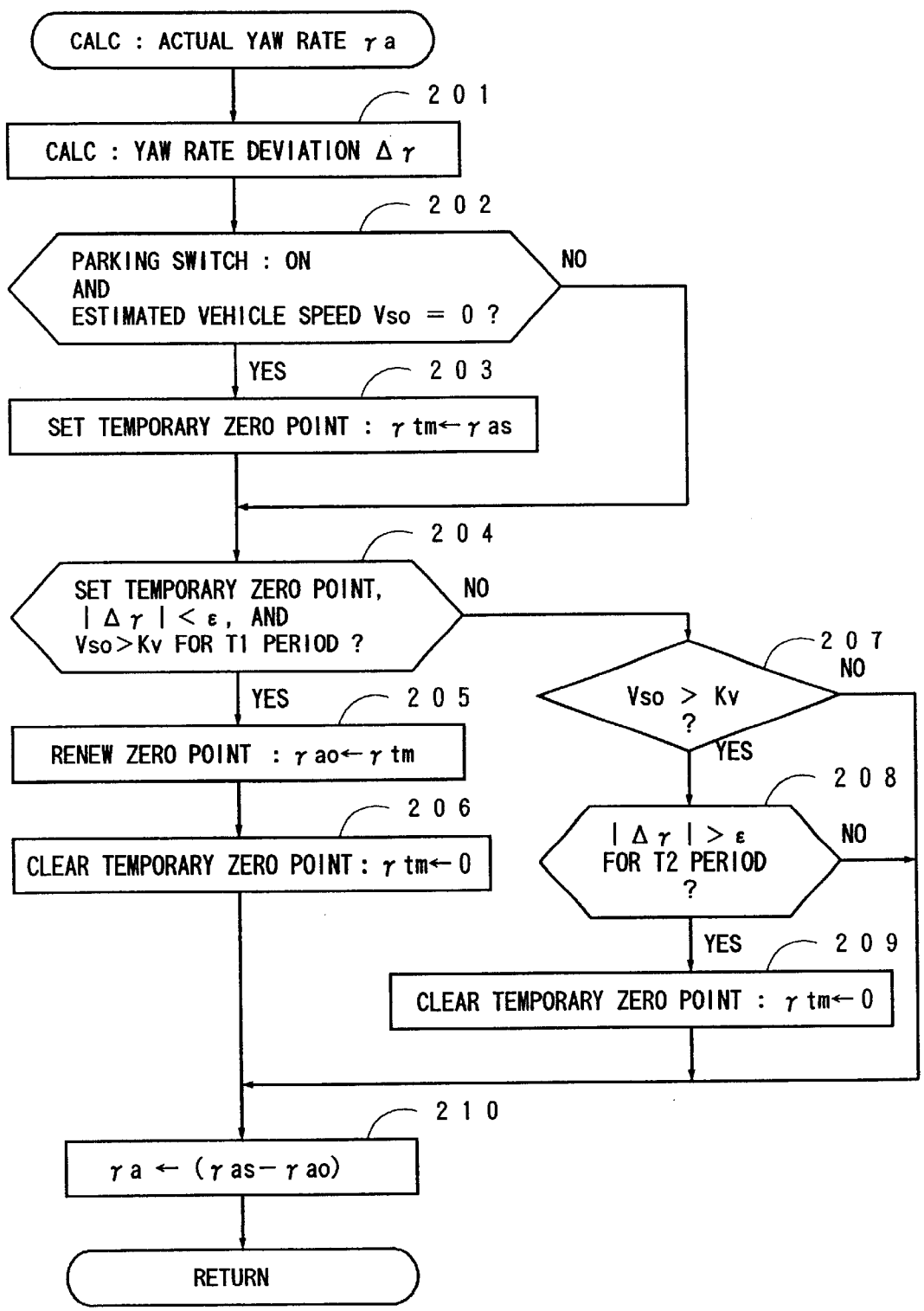
FIG. 4 is a flowchart showing a subroutine for calculating an actual yaw rate γa for use in the steering control by braking executed in FIGS. 3A and 3B.

FIG. 4 shows a flowchart for calculating the actual yaw rate γa which is to be provided at Step 105 in FIG. 3A for the operation of the steering control by braking. At the outset, is calculated at Step 201 a deviation Δγ between the desired yaw rate γt calculated at Step 104 and the measured yaw rate γas measured by the yaw rate sensor YS (i.e., Δγ=γt−γas). Then, it is determined at Step 202 whether the vehicle is in its stopped state, or not. That is, it is determined whether the parking switch PB has been turned on, and the estimated vehicle speed Vso is zero. If these conditions are fulfilled, it is determined that the vehicle is in the stopped state, then the program proceeds to Step 203 where the measured yaw rate γas is set at a temporary zero point γtm, and further proceeds to Step 204. If the conditions are not fulfilled at Step 202, the program jumps to Step 204. Although it is selected as one of the conditions at Step 202 that the estimated vehicle speed Vso is zero, in the present embodiment, it may be selected as one of the conditions that the estimated vehicle speed Vso is equal to or smaller than a predetermined speed.

At Step 204, it is determined whether the temporary zero point γtm is to be actually set for the zero point. Namely, it is determined whether (1) the temporary zero point γtm has been set, (2) an absolute value of the deviation Δγ between the desired yaw rate γt and the measured yaw rate γas is smaller than a predetermined value ε, and (3) the estimated vehicle speed Vso exceeds a predetermined speed Kv, and these conditions (1)–(3) have continued for a predetermined time period T1 (e.g., 0.5 sec). If all of these conditions have been fulfilled, the program proceeds to Step 205 where the zero point γao is reneweed by the temporary zero point γtm, and then the temporary zero point γtm is cleared to be zero at Step 206. Unless the conditions at Step 204 have been fulfilled, the program proceeds to Step 207, where it is determined whether the estimated vehicle speed Vso has exceeded the predetermined speed Kv, or not. If the estimated vehicle speed Vso is lower than the predetermined speed Kv, the program jumps from 207 to Step 210. In other words, the Step 205 is not executed, but the previous zero point which was provided when the vehicle was in the stopped state, is used, in the case where the absolute value of the deviation Δγ is equal to or greater than the predetermined value ε, or the case where such a state that the estimated vehicle speed Vso exceeds the predetermined speed Kv has continued for the period less than the predetermined time period T1.

If it is determined at Step 207 that the estimated vehicle speed Vso exceeds the predetermined speed Kv, the program further proceeds to Step 208, where it is determined whether such a state that the absolute value of the deviation Δγ is greater than the predetermined value ε has continued for a predetermined time period T2 (e.g., 2 seconds). If the result is negative, the program proceeds to Step 210. However, in the case where the estimated vehicle speed Vso exceeds the predetermined speed Kv, and such a state that the absolute value of the deviation Δγ exceeds the predetermined value ε has continued for the predetermined time period T2, then the temporary zero point γtm is cleared to be zero at Step 209, and further proceeds to Step 210. In other words, the zero point will not be renewed, hereinafter, until the vehicle stops. Accordingly, at Step 210, the zero point γao is subtracted from the measured yaw rate γas of the yaw rate sensor YS to provide the actual yaw rate γa (i.e., γa=γas−γao). In this case, the zero point γao is renewed at Step 205. In the case where the result was negative at Step 204, however, the zero point γao, which was renewed previously, i.e., prior to the previous calculation timing, is used.

Figure 5:
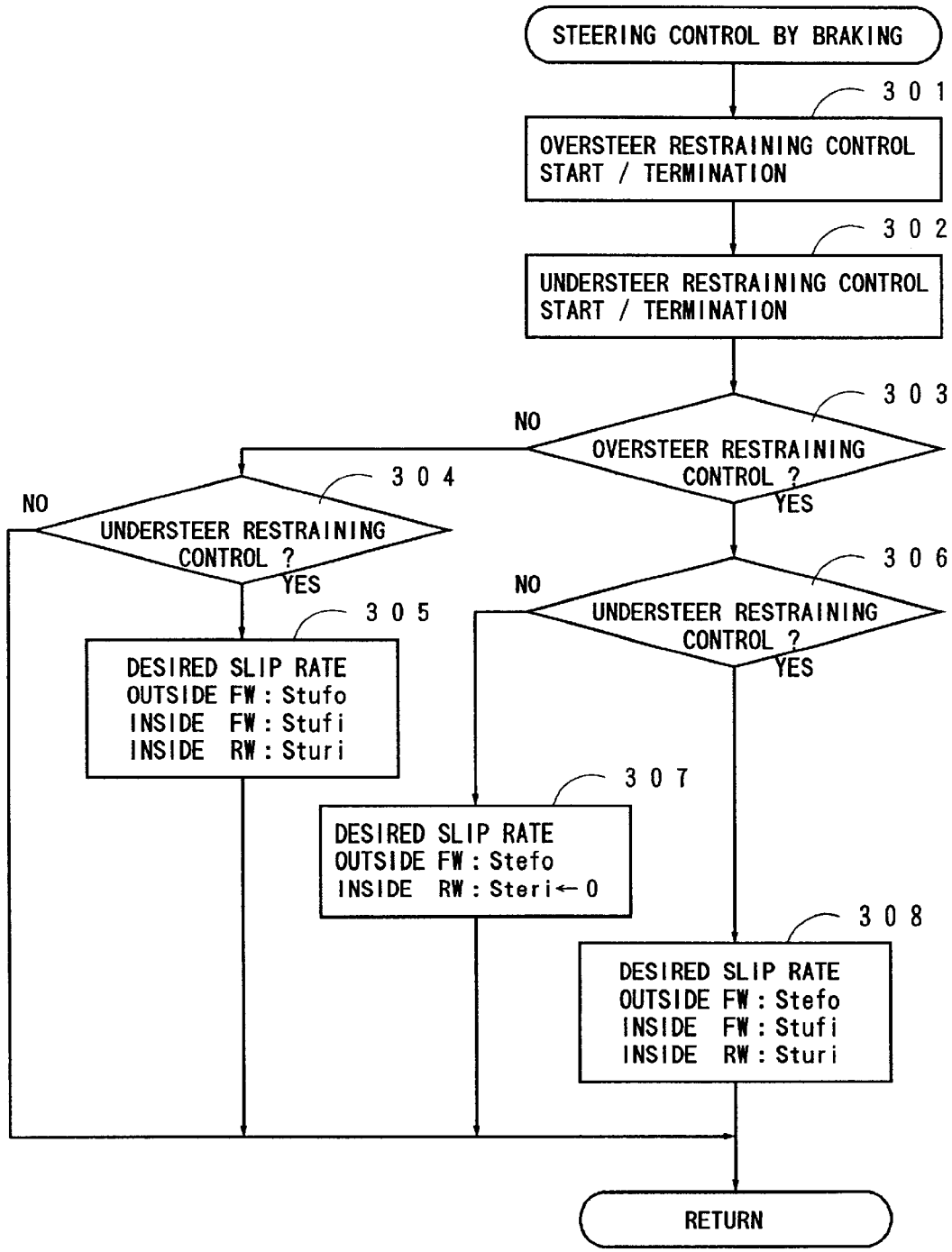
FIG. 5 is a flowchart showing a subroutine for setting a desired slip rate for use in the steering control by braking executed in FIGS. 3A and 3B.
Figure 7:
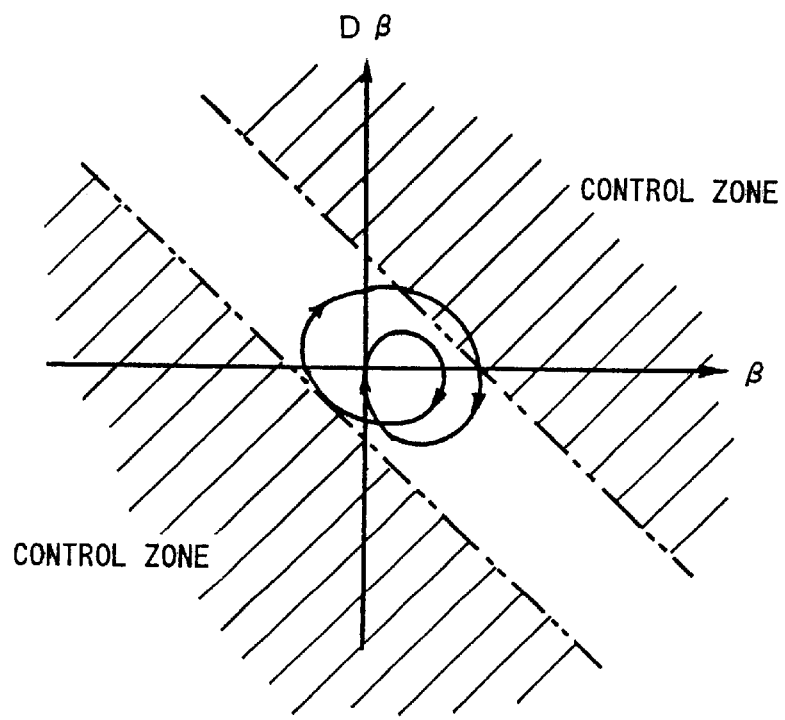
FIG. 7 is a diagram showing a region for determining start and termination of the oversteer restraining control for use in the steering control by braking executed in FIGS. 3A and 3B.

FIG. 5 shows a flowchart for the operation of the steering control by braking executed at Step 109 in FIG. 3A, which includes the oversteer restraining control and the understeer restraining control. Through this flowchart, therefore, the desired slip rates are set in accordance with the oversteer restraining control and/or the understeer restraining control. At the outset, it is determined at Step 301 whether the oversteer restraining control is to be started or terminated, and also determined at Step 302 whether the understeer restraining control is to be started or terminated. More specifically, the determination is made at Step 301 on the basis of the determination whether it is within a control zone indicated by hatching on a β-Dβ plane as shown in FIG. 7. That is, if the vehicle slip angle β and the vehicle slip angular velocity Dβ which are calculated when determining the start or termination, are fallen within the control zone, the oversteer restraining control will be started. However, if the vehicle slip angle β and the vehicle slip angular velocity Dβ come to be out of the control zone, the oversteer restraining control will be controlled as indicated by the arrow in FIG. 7 thereby to be terminated. Therefore, the boundary between the control zone and non-control zone (as indicted by two dotted chain line in FIG. 7) corresponds to the boundary of a starting zone. And, the braking force applied to each wheel is controlled in such a manner that the farther they remote from the boundary between the control zone and non-control zone (two dotted chain line in FIG. 7) toward the control zone, the more the amount to be controlled will be provided.

Figure 8:
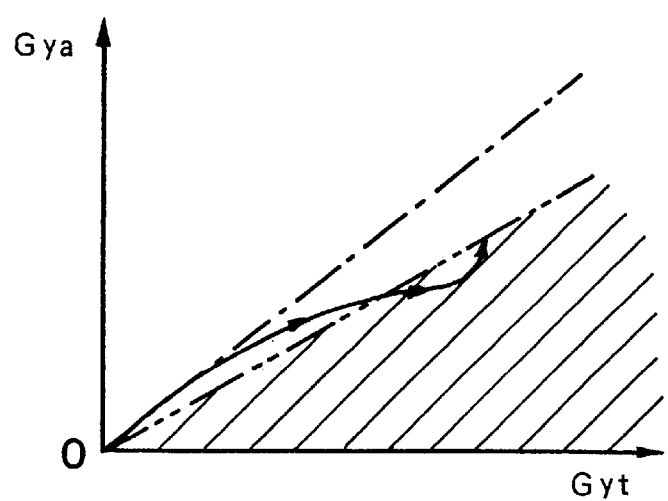
FIG. 8 is a diagram showing a region for determining start and termination of the understeer restraining control for use in the steering control by braking executed in FIGS. 3A and 3B.

On the other hand, the determination of the start and termination is made at Step 302 on the basis of the determination whether it is within a control zone indicated by hatching in FIG. 8. That is, in accordance with the variation of the actual lateral acceleration Gya against a desired lateral acceleration Gyt, if they become out of the desired condition as indicated by one dotted chain line, and fallen within the control zone, then the understeer restraining control will be started. If they come to be out of the zone, the understeer restraining control will be controlled as indicated by the arrow in FIG. 8 thereby to be terminated.

Then, the program proceeds to Step 303, where it is determined whether the oversteer restraining control is to be performed or not. If the oversteer restraining control is not to be performed, the program further proceeds to Step 304 where it is determined whether the understeer restraining control is to be performed or not. In the case where the understeer restraining control is not to be performed, the program returns to the main routine. In the case where it is determined at Step 304 that the understeer restraining control is to be performed, the program proceeds to Step 305 where the desired slip rate of each wheel is set to a desired slip rate which is provided for use in the understeer restraining control. If it is determined at Step 303 that the oversteer restraining control is to be performed, the program proceeds to Step 306 where it is determined whether the understeer restraining control is to be performed or not. In the case where the understeer restraining control is not to be performed, the program proceeds to Step 307 where the desired slip rate of each wheel is set to a desired slip rate which is provided for use in the oversteer restraining control. In the case where it is determined at Step 306 that the understeer restraining control is to be performed, the program proceeds to Step 308 where the desired slip rate of each wheel is set to a desired slip rate which is provided for use in both of the oversteer restraining control and the understeer restraining control.

With respect to the desired slip rate for use in the oversteer restraining control set at Step 307, the vehicle slip angle β and the vehicle slip angular velocity Dβ are employed. With respect to the desired slip rate for use in the understeer restraining control, a difference between the desired lateral acceleration Gyt and the actual acceleration Gya is employed. The desired lateral acceleration Gyt is calculated in accordance with the following equations:

$$Gyt = \gamma t \cdot Vso$$

At Step 305, the desired slip rate of a front wheel located on the outside of the curve of the vehicle's path is set as "Stufo", the desired slip rate of a front wheel located on the inside of the curve is set as "Stufi", and the desired slip rate of a rear wheel located on the inside of the curve is set as "Sturi". As for the slip rate, "t" indicates a desired value, which is comparable with a measured actual value indicated by "a". Then, "u" indicates the understeer restraining control, "f" indicates the front wheel, "r" indicates the rear wheel, "o" indicates the outside of the curve, and "i" indicates the inside of the curve, respectively.

At Step 307, the desired slip rate of the front wheel located on the outside of the curve is set as "Stefo", and the desired slip rate of the rear wheel located on the inside of the curve is set as "Steri", wherein "e" indicates the oversteer restraining control. Whereas, at Step 308, the desired slip rate of the front wheel located on the outside of the curve is set as "Stefo", the desired slip rate of the front wheel located on the inside of the curve is set as "Stufi", and the desired slip rate of the rear wheel located on the inside of the curve is set as "Sturi". That is, when both of the oversteer restraining control and the understeer restraining control are performed simultaneously, the desired slip rate of the front wheel located on the outside of the curve is set to be the same rate as the desired slip rate for use in the oversteer restraining control, while the desired slip rates of the rear wheels are set to be the same rates as the desired slip rates for use in the understeer restraining control. In any cases, however, a rear wheel located on the outside of the curve, i.e., a non-driven wheel of the front drive vehicle is not to be controlled, because this wheel is employed as a reference wheel for use in calculation of the estimated vehicle speed.

The desired slip rates Stefo for use in the oversteer restraining control is calculated in accordance with the following equation:

$$Stefo = K1 \cdot \beta + K2 \cdot D\beta$$

where K1, K2 are constants which are set so as to provide the desired slip rate Stefo which is used for increasing the braking pressure (i.e., increasing the braking force). However, the desired slip rate Steri of the rear wheel located on the inside of the curve is set to be zero.

On the contrary, the desired slip rates Stufo, Sturi for use in the understeer restraining control are calculated in accordance with the following equations, respectively:

$$Stufo = K3 \cdot \Delta Gy$$

$$Sturi = K4 \cdot \Delta Gy$$

$$Stufi = K5 \cdot \Delta Gy$$

where K3 is a constant for providing the desired slip rate Stufo which is used for increasing the braking pressure (or, alternatively decreasing the braking pressure), while K4, K5 are constants for providing the desired slip rate, which are used for increasing the braking pressure.

Figure 6:
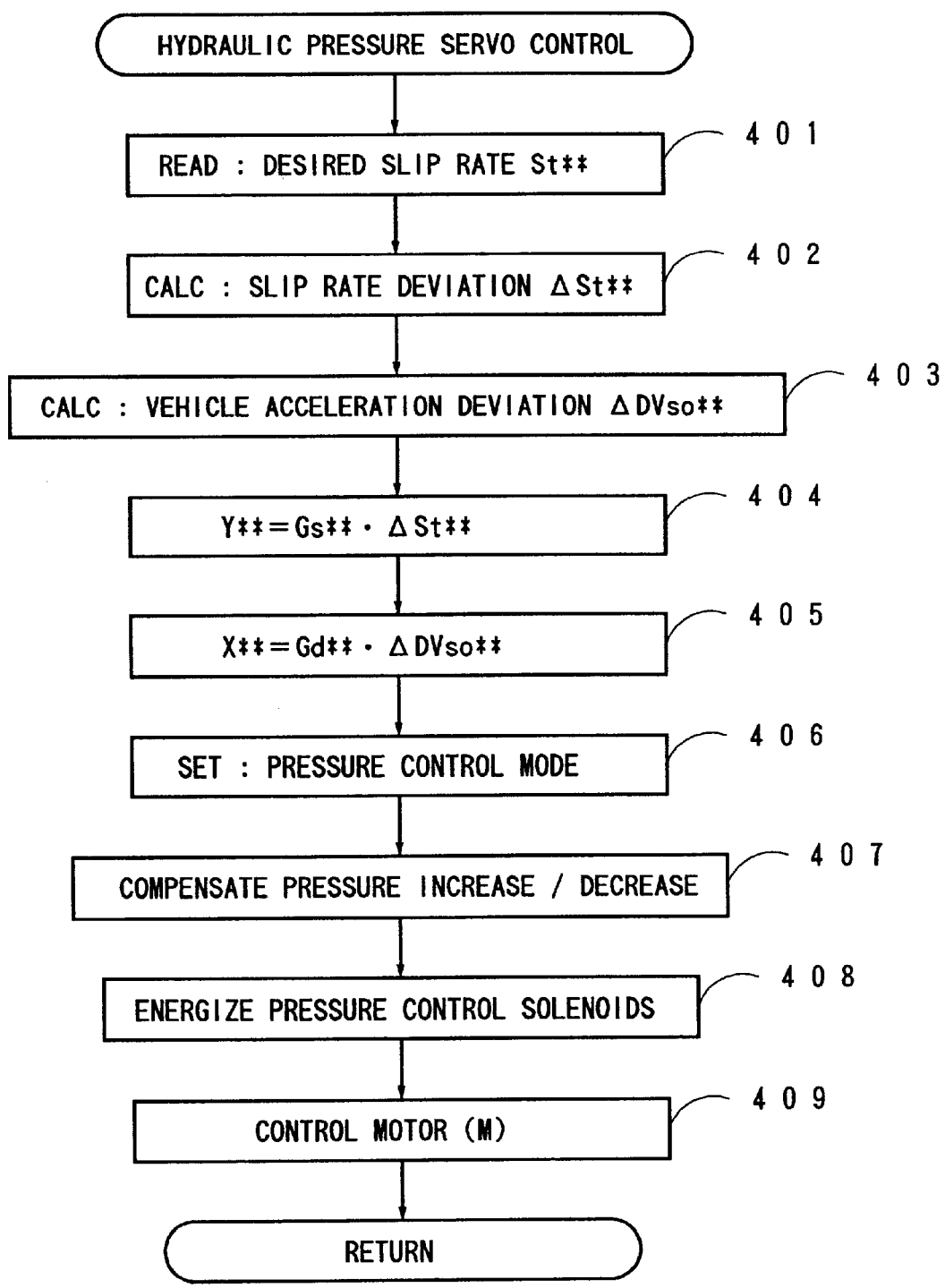
FIG. 6 is a flowchart showing a hydraulic pressure servo control in the steering control by braking executed in FIGS. 3A and 3B.

FIG. 6 shows the hydraulic pressure servo control which is executed at Step 118 in FIG. 3A, and wherein the wheel cylinder pressure for each wheel is controlled through the slip rate servo control. At Step 401, the desired slip rates St, which are set at Step 305, 307 or 308, are read to provide the desired slip rate for each wheel of the vehicle. Then, the program proceeds to Step 402 where a slip rate deviation $\Delta St^{}$ is calculated for each wheel, and further proceeds to Step 403 where a vehicle acceleration deviation $\Delta DVso^{}$ is calculated. At Step 402, the difference between the desired slip rate $St^{}$ and the actual slip rate $Sa^{}$ is calculated to provide the slip rate deviation $\Delta St^{}$ (i.e., $\Delta St^{}=St^{}-Sa^{}$). And, at Step 403, the difference between the estimated vehicle acceleration DVso on the center of gravity of the vehicle and the vehicle acceleration $DVw^{}$ of a selected wheel is calculated to provide the vehicle acceleration deviation A $DVso^{}$. The actual slip rate $Sa^{}$ and the vehicle acceleration deviation $\Delta DVso^{**}$ may be calculated in accordance with a specific manner which is determined in dependence upon the control modes such as the anti-skid control mode, traction control mode or the like, the explanation of which will be omitted.

Figure 9:
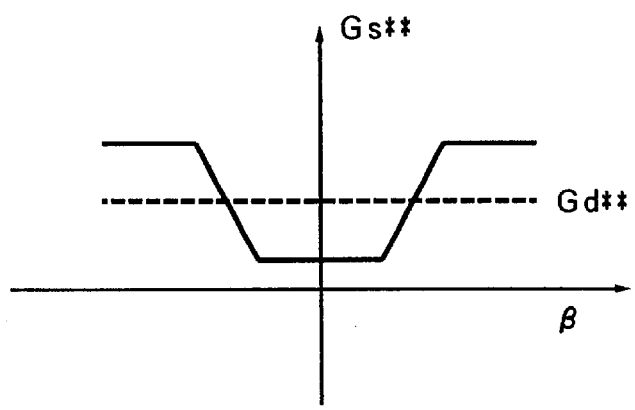
FIG. 9 is a diagram showing a relationship between a vehicle slip angle and a gain for calculating the parameters for use in the steering control by braking executed in FIGS. 3A and 3B.
Figure 10:
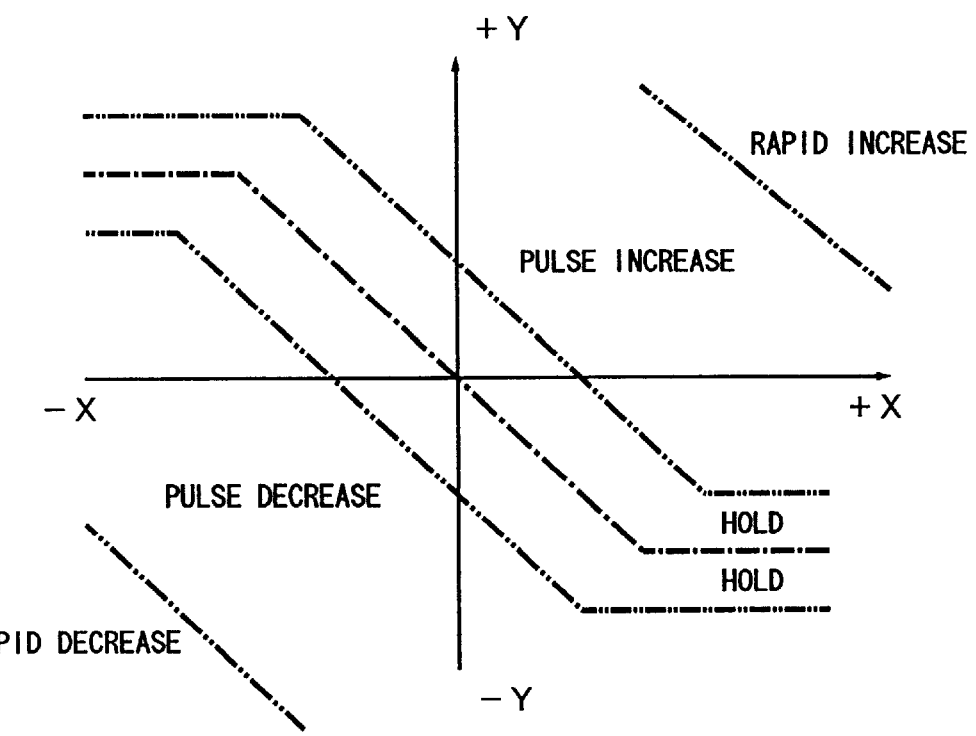
FIG. 10 is a diagram showing a relationship between the pressure control modes and parameters for use in the steering control by braking executed in FIGS. 3A and 3B.

Then, the program proceeds to Step 404 where a parameter $Y^{**}$ for providing a hydraulic pressure control in each control mode is calculated in accordance with the following equation:

$$Y^{}=Gs^{}\cdot \Delta St^{**}$$

where "$Gs^{}$" is a gain, which is provided in response to the vehicle slip angle $\beta$ and in accordance with a diagram as shown by a solid line in FIG. 9. The program further proceeds to Step 405 where another parameter $X^{}$ is calculated in accordance with the following equation:

$$X^{}=Gd^{}\cdot \Delta DVso^{**}$$

where "$Gd^{}$" is a gain which is a constant value as shown by a broken line in FIG. 9. On the basis of the parameters $X^{}$ and $Y^{}$, a pressure control mode for each wheel is provided at Step 406, in accordance with a control map as shown in FIG. 10. The control map has a rapid pressure decrease zone, a pulse pressure decrease zone, a pressure hold zone, a pulse pressure increase zone, and a rapid pressure increase zone which are provided in advance as shown in FIG. 10, so that any one of the zones is selected in accordance with the parameters $X^{}$ and $Y^{}$ at Step 406**. In the case where no control mode is performed, no pressure control mode is provided (i.e., solenoids are off).

At Step 407, is performed a pressure increase and decrease compensating control, which is required for smoothing the first transition and last transition of the hydraulic pressure, when the presently selected zone is changed from the previously selected zone at Step 406, e.g., from the pressure increase zone to the pressure decrease zone, or vice versa. When the zone is changed from the rapid pressure decrease zone to the pulse pressure increase zone, for instance, the rapid pressure increase control is performed for a period which is determined on the basis of a period during which the rapid pressure decrease mode, which was provided immediately before the rapid pressure increase control, lasted. Then, the program proceeds to Step 408, where the solenoid of each valve (not shown) in the hydraulic pressure control apparatus BC is energized or de-energized in accordance with the mode determined by the selected pressure control zone or the pressure increase and decrease compensating control thereby to control the braking force applied to each wheel. The structure of the hydraulic pressure control apparatus BC is the same as the apparatus installed in the prior vehicle motion control system, and it is not directly related to the present invention, its explanation will be omitted.

Then, the program proceeds to Step 409 where a motor for driving pressure pumps (not shown) is actuated. Although the slip rate is used for the control in the present embodiment, any value corresponding to the braking force applied to each wheel, such as the braking pressure in each wheel brake cylinder, may be employed as the desired value for the control.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. An apparatus for detecting a yaw rate of a vehicle comprising:

a yaw rate sensor for measuring a yaw rate of a vehicle;

stoppage determining means for determining a stopped state of said vehicle;

zero point setting means for setting a zero point at the yaw rate measured by said yaw rate sensor when said stoppage determining means determines the stopped state of said vehicle;

actual yaw rate calculating means for calculating an actual yaw rate of said vehicle in response to an output of said yaw rate sensor, on the basis of the zero point set by said zero point setting means;

vehicle speed detecting means for detecting for detecting a vehicle speed of said vehicle;

steering angle detecting means for detecting for detecting a steering angle of said vehicle;

desired yaw rate setting means for setting a desired yaw rate on the basis of the vehicle speed detected by said vehicle speed detecting means and the steering angle detected by said steering angle detecting means;

steering angle detecting means for detecting a steering angle of said vehicle;

desired yaw rate setting means for setting a desired yaw rate on the basis of the vehicle speed detected by said vehicle speed detecting means and the steering angle detected by said steering angle detecting means;

zero point correcting means for correcting the zero point set by said zero point setting means in response to a comparison of the desired yaw rate set by said desired yaw rate setting means and the actual yaw rate calculated by said actual yaw rate calculating means; and wherein said zero point setting means includes temporary zero point setting means for setting a temporary zero point in response to the result determined by said stoppage determining means, and wherein said zero point correcting means includes deviation calculating means for calculating a deviation between the desired yaw rate set by said desired yaw rate setting means and the actual yaw rate calculated by said actual yaw rate calculating means in response to the output of said yaw rate sensor, on the basis of the temporary zero point set by said temporary zero point setting means, and said zero point correcting means is adapted to correct the zero point on the basis of the temporary zero point, in response to the deviation calculated by said deviation calculating means and the vehicle speed detected by said vehicle speed detecting means.

2. The apparatus as set forth in claim 1, wherein said stoppage determining means includes a parking switch activated in response to a state of a parking brake of said vehicle, and wherein said stoppage determining means is adapted to determine the stopped state of said vehicle, when it is determined that said parking brake is activated on the basis of an output of said parking switch, and that the vehicle speed is lower than a predetermined speed on the basis of the output of said vehicle speed detecting means.

3. The apparatus as set forth in claim 1, wherein said actual yaw rate calculating means is adapted to calculate the actual yaw rate by subtracting the yaw rate at the temporary zero point from the yaw rate measured by said yaw rate sensor.

4. The apparatus as set forth in claim 1, wherein said zero point correcting means is adapted to renew the zero point by the temporary zero point, when the deviation calculated by said deviation calculating means is lower than a predetermined value, and such a state that the vehicle speed detected by said vehicle speed detecting means exceeds a predetermined speed has continued for a period longer than a predetermined time period.

5. The apparatus as set forth in claim 1, wherein said zero point correcting means is prohibited from correcting the zero point, when such a state that the deviation calculated by said deviation calculating means exceeds a predetermined value has continued for more than a predetermined time period.

6. A The method for detecting a yaw rate of a vehicle, comprising:

measuring a yaw rate of a vehicle by a yaw rate sensor;

determining stopped state of said vehicle;

setting a zero point at the yaw rate measured by said yaw rate sensor when the stopped state of said vehicle is determined;

calculating an actual yaw rate of said vehicle by subtracting the yaw rate at the zero point from the yaw rate measured by said yaw rate sensor;

detecting a vehicle speed of said vehicle;

detecting a steering angle of said vehicle;

setting a desired yaw rate on the basis of the vehicle speed and the steering angle;

correcting the zero point in response to a comparison of the desired yaw rate and the actual yaw rate; and wherein a temporary zero point is set when the stopped state of said vehicle is determined, and wherein a deviation between the desired yaw rate and the actual yaw rate is calculated in response to the output of said yaw rate sensor, on the basis of the temporary zero point, and wherein the zero point is corrected on the basis of the temporary zero point, in response to the deviation and the vehicle speed.

7. The method as set forth in claim 6, wherein the actual yaw rate is calculated by subtracting the yaw rate at the temporary zero point from the yaw rate measured by said yaw rate sensor.

8. The method as set forth in claim 6, wherein the zero point is renewed by the temporary zero point, when the deviation calculated by said deviation calculating means is lower than a predetermined value, and such a state that the vehicle speed detected by said vehicle speed detecting means exceeds a predetermined speed has continued for a period longer than a predetermined time period.

* * * * *